(No Model.)  3 Sheets—Sheet 1.

J. W. HYATT.
DOWNWARD FILTRATION.

No. 445,585.  Patented Feb. 3, 1891.

(No Model.) 3 Sheets—Sheet 3.
J. W. HYATT.
DOWNWARD FILTRATION.

No. 445,585. Patented Feb. 3, 1891.

UNITED STATES PATENT OFFICE.

JOHN W. HYATT, OF NEWARK, NEW JERSEY.

DOWNWARD FILTRATION.

SPECIFICATION forming part of Letters Patent No. 445,585, dated February 3, 1891.

Application filed June 16, 1890. Serial No. 355,531. (No model.)

*To all whom it may concern:*

Be it known that I, JOHN W. HYATT, a citizen of the United States, residing at Newark, Essex county, New Jersey, have invented certain new and useful Improvements in Downward Filtration, fully described and represented in the following specification and the accompanying drawings, forming a part of the same.

This invention relates to a filter composed of a bed of granular material, through which the water is forced downward and discharged from outlets located in the lower part of the same.

The invention consists in locating the filter-inlet within the substance of the filter-bed below its surface and discharging the fluid upward at separate points upon the surface of the bed. By this construction cavities are formed in the surface of the filter-bed, the area of which cavities greatly increases the surface exposed to the unfiltered water, and thereby augments the unfiltered capacity of the bed.

The filter-bed in this invention is washed by reversing the current of water through the same as heretofore practiced.

The invention will be understood by reference to the annexed drawings, in which—

Figure 1:
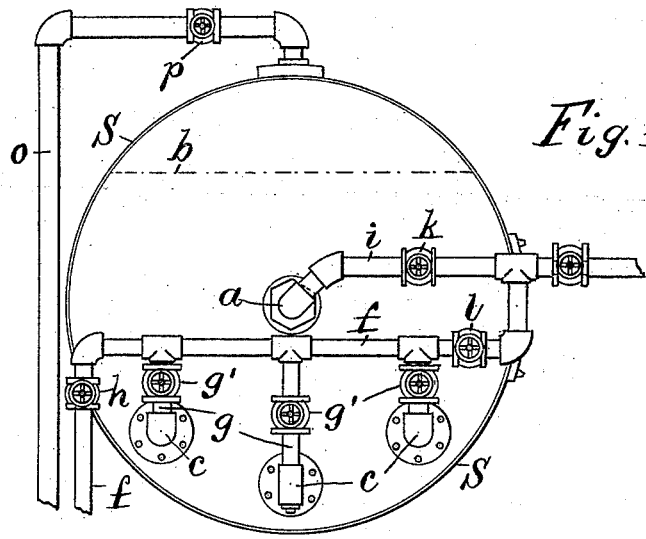
Figure 2:
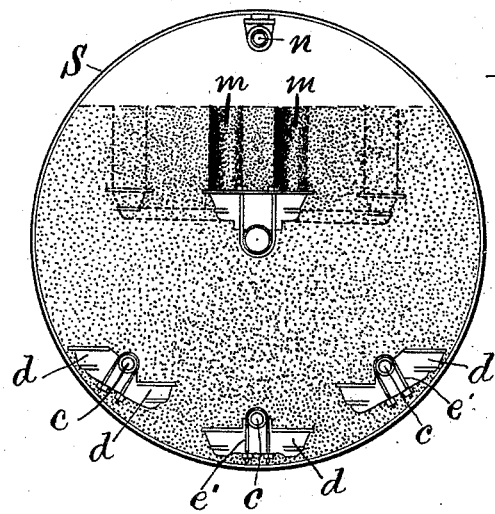

Figure 1 is an end elevation of a horizontal cylindrical shell containing the bed of granular material. Fig. 2 is a transverse section of the same on line $x\,x$ in Fig. 3, which latter figure is a longitudinal section of the shell, showing the filter inlets and outlets. Fig. 4 shows the surface of the filter-bed in plan, with the parts in section where hatched.

S is the cylindrical shell arranged horizontally, with heads S' at its opposite ends. The heads are braced in the middle by a tubular stay-rod $a$, which is utilized to introduce the unfiltered fluid within the casing, the line $b$ representing the level to which the casing is filled with granular material to form the filter-bed with water-space B' above the same.

Outlet-pipes $c$ are arranged within the lower part of the filter-bed and provided with a series of inlet-strainers $d$, and a series of inlet-strainers $e$ is shown attached to the inlet-pipe $a$. The strainers are preferably constructed with shot covered with a grating to permit the passage of fluid while preventing the escape of the granular material, as previously patented by me; but any construction of strainers may be used. The pipes $a$ and $c$ are extended through one of the heads to make the requisite water connections, the pipes $c$ being joined with a delivery-pipe $f$ by suitable branches $g$, provided with cocks $g'$. The pipe $f$ is provided with an independent stop-cock $h$. The pipe $a$ is connected with a supply-pipe $i$, provided with a cock $k$, and the supply-pipe is also connected with the branches $g$ by a cock $l$, so that the unfiltered fluid can be directed into the pipes $c$ during the washing of the filter-bed.

In Fig. 2 the granular substance of the filter-bed is shown with a cavity $m$ above the inlet-strainers $e$, such cavity being produced by the entering current of fluid when the water is admitted to the inlet-strainers. Such cavity is formed in the surface of the filter-bed over each of the inlet-strainers, as represented by the dotted lines $m$ in Fig. 3, where the substance of the filter-bed is indicated merely by such lines and the cavities are clearly shown in Fig. 4. The filter-casing being closed, the water may be admitted at any desired pressure, and thus fills the entire space above the filter-bed $b$, and is compelled to pass downward through the bed to escape by the outlets $d$. It is obvious that during the filtering operation the effective surface of the filter-bed includes the walls of the cavites $m$ as well as the remaining upper surface of the filter-bed, and that the total area exposed to the water-pressure is thus very greatly increased by locating the inlet-strainers below the surface of the bed so as to form such cavities.

In filters constructed with granular material the deposition of impurities upon its surface interrupts the filtering operation and necessitates the cleaning of the filter-bed, and any increase in the surface of the filter-bed permits a greater delivery from the filter or a prolonged use of the bed with the same delivery.

In a filter-bed of given dimensions the filtering area may be greatly increased by the use of my invention, and the use of a filter with a given delivery may be thus greatly prolonged and the proportional loss of time consumed in cleansing the filter may be greatly reduced.

When filtering, the cock $l$ would be closed to direct the unfiltered fluid wholly into the pipe $a$ and the cocks $g'$ and $h$ would be opened to deliver the unfiltered water from the bed.

A waste-pipe $n$ is shown inserted within the upper part of the casing, with holes $n'$ in its upper side only and a connection from the pipe through the casing to an overflow-pipe $o$, provided with a cock $p$. The cock $p$ would be closed during the filtering operation, but during the washing of the bed it would be opened to discharge the impurities from the filter-casing. At such time the cock $k$ would be closed and the cock $l$ opened to divert the water into the branches $g$ and pipes $c$, the cock $h$ being closed, so that the water would rise within the filter-bed and disintegrate its whole substance to separate the impurties therefrom.

It is obvious that the cavities $m$ in the surface of the bed divide its surface into small portions which are readily broken up by the washing-fluid, and the impurities separated therefrom more readily than if the filtering-surface were altogether flat. It is obvious that the filter-bed having its surface broken up by the cavities $m$ may be washed much more effectively with the same water-current than a bed with flat surface, as the substance of the bed about the cavities is broken up into portions of very little thickness or strength.

Having thus set forth the nature of my invention, it will be understood that the form of the filter-casing and the nature of the inlets and outlets may be varied without affecting the operation of the invention; and that the inlet-strainers may be provided in any number and arranged in any order below the surface of the filter-bed, provided they operate to produce the effect described herein.

The particular form of heads shown upon the casing and the hollow tie-rod for introducing fluid within the same I have made the subject of a separate patent application, No. 351,425, but have claimed herein the connection of the filter strainers with such a central pipe-tie.

The strainers $d$ and $e$ are shown clamped upon the pipes $c$ and $a$ by straps $e'$, and with such construction the pipe would be provided with a hole communicating with the interior of the strainer-casting; but such details of construction are not shown herein, as they form no part of the present invention.

As shown in dotted lines in Fig. 2 and in the plan in Fig. 4, the alternate pairs of inlet-strainers are set farther apart than the intermediate strainers, so as to form the cavities in different parts of the surface, and thus distribute the inlet-fluid over the top of the bed, to percolate through the whole of the latter on its passage to the outlet-strainers. It is entirely immaterial what arrangement of the strainers be adopted.

Figure 3:
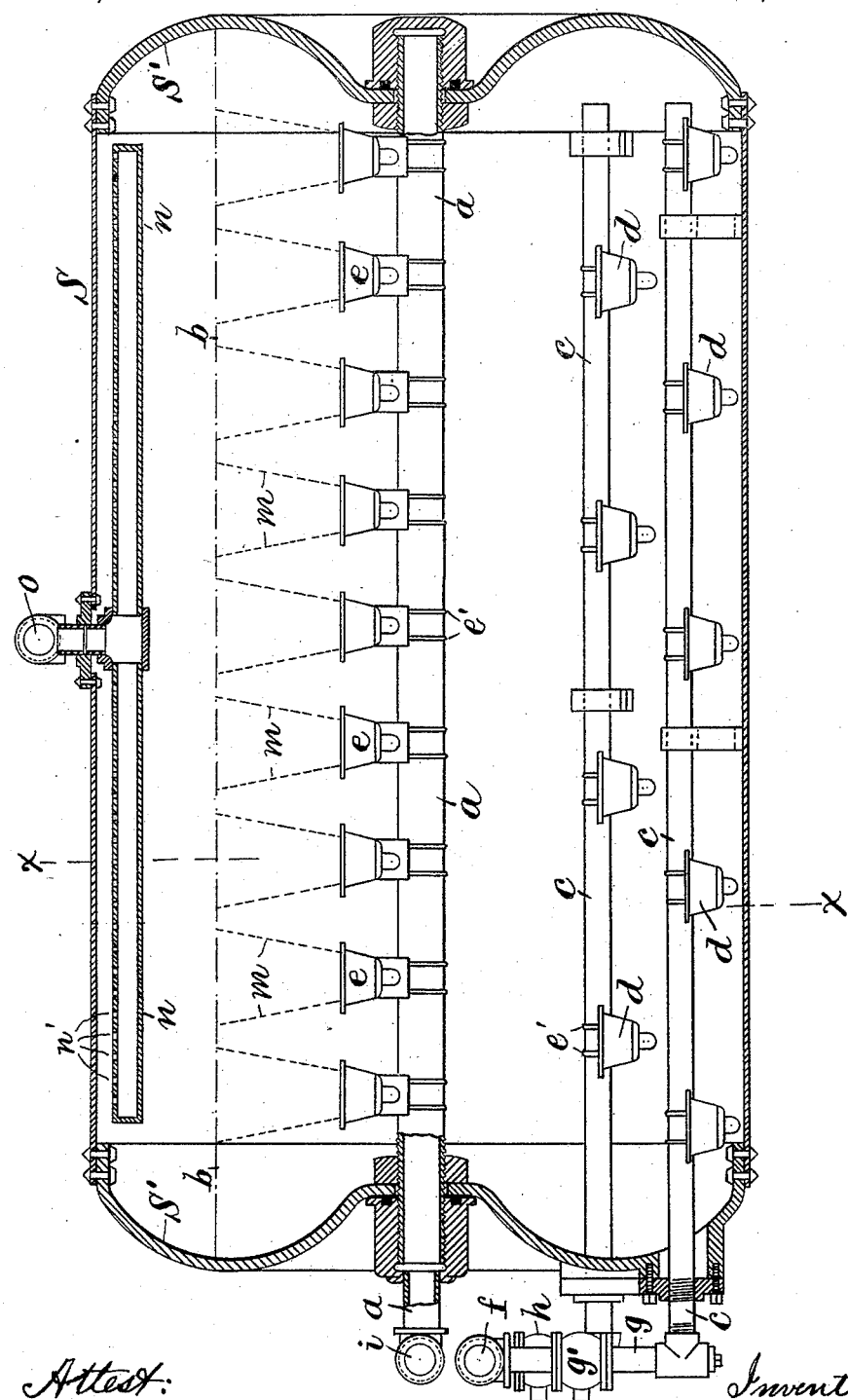
Figure 4:
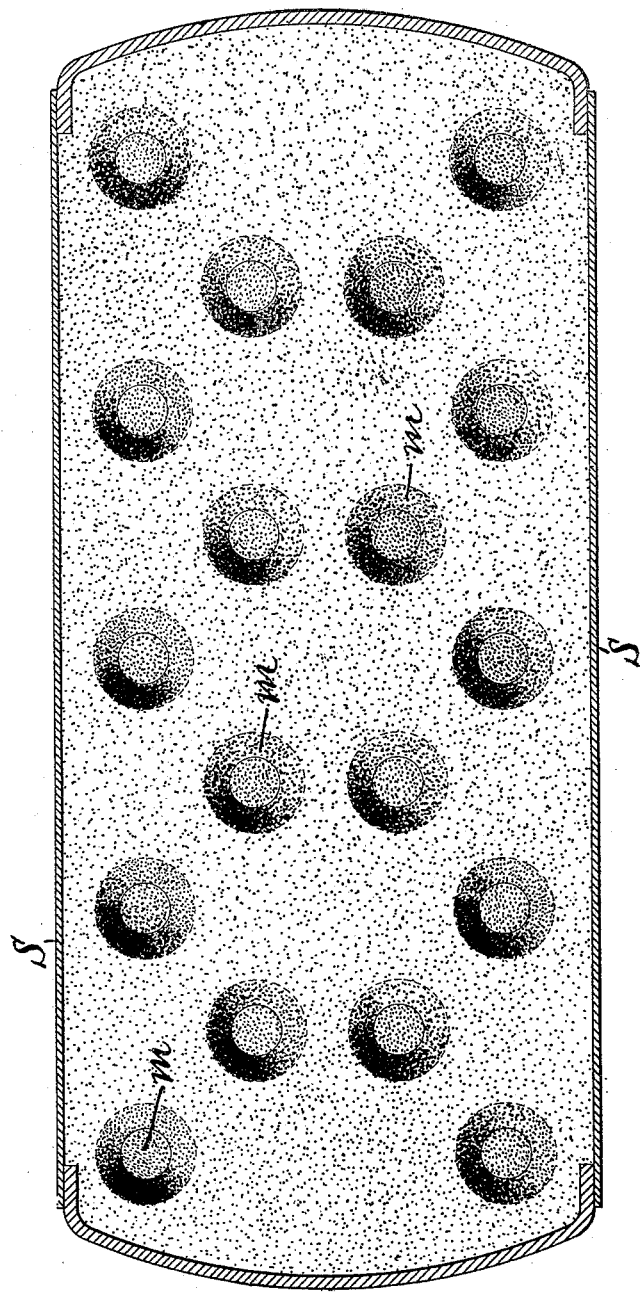

By using a horizontal cylindrical casing, as shown in Figs. 2 and 3, any desired increase of area upon the surface of the filter-bed may be readily obtained by increasing the length of the shell without augmenting its diameter, and without subjecting the shell to any increased strain per unit of area.

By using a horizontal cylindrical casing and introducing the inlet-pipe at or about the center of the cylinder, as shown in Fig. 2, it is obvious that a series of outlet-strainers arranged within the bottom of the bed adjacent to the shell S would be substantially equidistant from the inlet-strainers, and that the fluid would have to pass through an equal depth of filtering material to reach each of such outlet-strainers. A horizontal cylinder is therefore desirable in practicing my present invention, and I have therefore made a specific claim thereto.

I am aware that water-inlets have been inserted below the surface of a filter-bed in filters operated by downward filtration; but in all constructions previously used such a filter-inlet has been movable downward through the bed to introduce the fluid at a fresh point as the surface of the bed becomes fouled. Such a construction is shown in United States Patent No. 243,233, dated June 21, 1881, but obviously necessitates the use of mechanism to move the inlet-pipe gradually downward and to maintain a fluid connection from the exterior of the filter to such movable pipe. Such a construction is very complicated, and the object of my present invention is to wholly avoid such complication and to furnish a simple, durable, and effective construction which shall be entirely suited for practical use. My present invention possesses these features, as it greatly increases the filtering capacity of a given filter-bed and greatly facilitates the disintegration of the upper portion of the bed during the washing operation, and thereby promotes the complete removal of the impurities from the granular material in the bed.

In Fig. 2 the cavities $m$ are shown of nearly cylindrical shape, while in Figs. 3 and 4 they are shown flared upwardly. The cylindrical shape would be produced by supplying the inlet-fluid at a moderate speed which would barely supply the percolation through the outlet-strainers, while a more violent current would produce the conical form shown in Figs. 3 and 4.

It is essential to my invention that the inlets should be constructed to prevent the access of the granular material thereto, which is readily effected by the shot-valves described in my patent, No. 322,103, dated July 14, 1885, or by any form of fine grating or netting, and while it is preferable that the inlets should open toward the surface of the bed it is not absolutely essential as a stationary inlet arranged beneath the surface of the bed will operate in the desired manner if the openings are fine enough to prevent their clogging by the sand during the washing of the filter-bed and the current be introduced with such velocity as not to disintegrate the body of the filter-bed.

I am aware that longitudinal perforated pipes have been inserted beneath the surface of the filter-bed to disintegrate its entire area to remove the impurities from the filter-bed and to wash them from the casing by a suitable outlet above the surface of the bed. My invention differs from such a construction in the following respects:

First. The fluid introduced is not a washing-fluid and is not introduced during the washing operation, but is the fluid to be filtered, and is introduced during the normal operation of the filter.

Second. My inlets are not connected with a pipe for supplying washing-water, nor does the water they discharge operate to disintegrate the entire surface of the filter-bed, but operates to cut away distinct portions of the bed, leaving the remaining portions standing to form walls around the cavities produced and thus increase the filtering area of the bed. It is obvious that the form of the cavities is immaterial.

Third. My invention requires that the outlets for filtered water in the bottom of the bed should be open when the water is supplied to my inlet $e$, while no such outlet is required in the bottom of the bed when washing-pipes are operated.

Fourth. My inlet-strainers $e$ can perform their functions when the filter-casing is wholly closed, and in fact can perform them with greater rapidity at such times, whereas washing-pipes cannot perform any function until an outlet is formed from the filter-casing to permit a current of water to disintegrate the bed.

Fifth. My pipes $e$ operate during the filtering operation to augment the filtering area of the bed, while the washing-pipes referred to do not augment the filtering area of the bed at any time in any manner.

I do not claim herein any construction whatever for washing the filter-bed, but disclaim the use of pipes located adjacent to its surface and connected with a pipe to supply washing-fluid to disintegrate the entire surface of the bed.

My invention is restricted to a series of stationary or fixed strainers located within the surface of the bed and operated exclusively as an inlet to supply water in the process of downward filtration.

What is claimed herein is—

1. The method of operating a filter containing a granular filter-bed with a water-space above the same, which consists in introducing the unfiltered fluid at intervals of space within the upper part of the filter-bed, below the surface, and forcing the unfiltered fluid upwardly through the bed into the water-space above the same and then downward through the substance of the filter-bed and outward through strainers located in the bottom of the same, substantially as herein set forth.

2. The combination, in a filter operated by downward filtration, of a casing containing a granular filter-bed with water-space $B'$ above the same, a series of separate inlet-strainers arranged at intervals within the substance of the filter-bed below the surface, with their discharge-apertures upon the upper side and adapted to cut away distinct portions of the filter-bed upon its surface, a pipe to supply the unfiltered fluid to such strainers during the filtering operation, outlet-strainers arranged in the lower part of the filter-bed, and a pipe connected therewith to draw the filtered water from such outlet-strainers, the whole arranged and operated as and for the purpose set forth.

3. The combination, in a filter having a horizontal cylindrical casing S, containing a granular filter-bed, with water-space $B'$ above the same, of the inlet-pipe $a$, inserted through the middle of the heads, and strainers $e$, connected with such pipe and arranged to discharge the fluid within the substance of the filter-bed, the series of outlet-pipes $c$, arranged within the bottom of the bed adjacent to the shell S and provided with strainers $d$, and suitable cocks and pipes for operating the same, substantially as herein set forth.

In testimony whereof I have hereunto set my hand in the presence of two subscribing witnesses.

JOHN W. HYATT.

Witnesses:
C. S. LOCKWOOD,
THOS. S. CRANE.